United States Patent
Bavant

[11] Patent Number: 6,144,978
[45] Date of Patent: Nov. 7, 2000

[54] METHOD AND DEVICE FOR THE APPROXIMATIVE COMPUTATION OF THE EXPONENTIAL MEAN OF A SEQUENCE OF CODED NUMBERS IN FLOATING POINT FORMAT

[75] Inventor: Marc Bavant, Paris, France

[73] Assignee: Thomson-CSF, Paris, France

[21] Appl. No.: 09/147,512

[22] PCT Filed: Jul. 11, 1997

[86] PCT No.: PCT/FR97/01286

§ 371 Date: Jan. 12, 1999

§ 102(e) Date: Jan. 12, 1999

[87] PCT Pub. No.: WO98/03034

PCT Pub. Date: Jan. 22, 1998

[30] Foreign Application Priority Data

Jul. 12, 1996 [FR] France .................................. 96 087 35

[51] Int. Cl.[7] .............................. G06F 17/10; G06F 1/02
[52] U.S. Cl. ............................................ 708/320; 708/277
[58] Field of Search .................................. 708/495, 277, 708/320

[56] References Cited

U.S. PATENT DOCUMENTS

| | | |
|---|---|---|
| 3,619,586 | 11/1971 | Hoff, Jr. et al. ........................ 708/320 |
| 4,774,685 | 9/1988 | Samuels . |
| 4,815,354 | 3/1989 | Kunimoto . |
| 5,258,938 | 11/1993 | Aramatsu . |
| 5,824,936 | 10/1998 | Dupuis et al. ........................ 708/277 |

OTHER PUBLICATIONS

Siu et al, "Intelligent Congestion Control for ABR Service in ATM Networks" Computer Communications Review, vol. 24, No. 5, Oct. 01, 1994, pp. 81–106.

Prycker, "Asynchronous Transfer Mode: Solution for Broadband ISDN", Prentice Hall Int. (UK) Limited, pp. 332–333, 1995.

*Primary Examiner*—Tan V. Mai
*Attorney, Agent, or Firm*—Oblon, Spivak, McClelland, Maier & Neustadt, P.C.

[57] ABSTRACT

The process applies to the approximate calculation of the exponential mean of a string of numbers $u_n$ coded in a floating-point format used to convey certain bit rate information in ATM networks, each number being defined with the aid of an exponent $e_n$ and a mantissa $m_n$ by a relation of the form $u_n = 2^{e_n} \cdot (1 + m_n/512)$. It consists in approximating the exponential mean by the code value associated with the exponential mean of the code words $U_n = 512 \cdot e_n + m_n$.

7 Claims, 2 Drawing Sheets

METHOD AND DEVICE FOR THE APPROXIMATIVE COMPUTATION OF THE EXPONENTIAL MEAN OF A SEQUENCE OF CODED NUMBERS IN FLOATING POINT FORMAT

BACKGROUND OF THE INVENTION

1. Field of the Invention

The present invention relates to a process for the approximate calculation of the exponential mean of a string of numbers coded in the floating-point format used to convey certain bit rate information in packet-switched data transmission networks known by the abbreviation ATM standing for "asynchronous transfer mode".

2. Discussion of the Invention

ATM networks provide several categories of data transmission service, one of which is known by the abbreviation ABR standing for "available bit rate". The latter service allows the user to use the passband available over the path of a previously established connection without obliging him/her to make a static reservation of resources when establishing the connection. In return for this flexibility, the two ends of the connection must adapt their bit rate to the passband available. For this purpose, particular ATM cells, known as RM cells, where RM stands for "resource management", make it possible to inform the ends of a connection about the availability of the resources in the network. These cells, generated and processed in real time by the end equipment attached to the network, and also by the ATM switches which form the nodes of the network, comprise fields intended to convey bit rate information. These fields represent for example the current permitted bit rate of the source—which is known by the abbreviation CCR "current cell rate"—, or the bit rate recommended to the source by the network—which is known by the abbreviation ER "explicit cell rate". These fields form the subject of a particular floating-point coding characterized by a nullity bit, 5 exponent bits and 9 mantissa bits.

Switches which have this capability calculate the ER bit rate and write it to the RM cells. Among all the possible algorithms for performing this calculation, one family of algorithms such as that described in the article by MM. Kai-Yeung Siu and Hong-Yi Treng entitled "Intelligent congestion control for ABR service in ATM networks", published in the journal COMPUTER COMMUNICATIONS REVIEW vol. 24 no. 5, 1.10.1994, implements a calculation of the "exponential mean" of the CCR bit rates conveyed by the RM cells. The "exponential mean" is nothing other than the result of a linear filtering obtained at the output of a discrete-time first-order digital filter. Denoting by $u_n$ the string of values which are applied to the filter and $x_n$ the string of states of the filter, the state equation of the filter can be written: calculation of the "exponential mean" of the CCR bit rates conveyed by the RM cells. The "exponential mean" is nothing other than the result of a linear filtering obtained at the output of a discrete-time first-order digital filter. Denoting by $u_n$ the string of values which are applied to the filter and $x_n$ the string of states of the filter, the state equation of the filter can be written:

$$x_{n+1} = a.x_n + (1-a).u_n \tag{1}$$

where a is a parameter less than 1, close to 1, which defines the horizon of the filter. The string $x_n$ thus represents a sort of more or less long-term instantaneous mean of the input values $u_n$.

Calculation of the "exponential mean" is an operation which must be done very rapidly, typically during the switching time of an ATM packet (cell). By way of example, for a 155 Mbit/s network highway, the switching time of a cell in a switch linked to this highway is around 2.8 microseconds. Given the coding of the data $u_n$ in floating format and the relative complexity of processing of these two multiplications followed by an addition, it is almost indispensable to call upon a microprocessor endowed with the capacity to perform arithmetic operations in this type of floating-point coding. Now, these processors are not at present very cheap.

SUMMARY OF THE INVENTION

The purpose of the invention is to alleviate the aforesaid drawbacks.

Hence, the subject of the invention is a process for the approximate calculation of the exponential mean of a string of numbers $u_n$ coded in a floating-point format used to convey certain bit rate information in ATM networks, each number being defined with the aid of an exponent $e_n$ and a mantissa $m_n$ by a relation of the form $u_n = 2^e n.(1+m_n/512)$, characterized in that it consists in approximating the exponential mean by the code value associated with the exponential mean of the code words $U_n = 512.e_n + m_n$.

The subject of the invention is also a device for implementing the process. The process and the device according to the invention have the main advantage that they make it possible rapidly to obtain an approximate value of the exponential mean by direct manipulation of the code words, in integer arithmetic and without involving the fixed-point format, thereby placing the calculation within the scope of current microprocessors.

BRIEF DESCRIPTION OF THE DRAWINGS

Other characteristics and advantages of the invention will emerge in the description which follows, given with regard to the figures of the appended drawings which represent.

DETAILED DESCRIPTION OF THE PREFERRED EMBODIMENTS

The code used for coding the bit rate information in an RM cell of an ATM network is a floating-point coding according to the relation:

$$U_n = 2^e n(1+m_n/512) \tag{2}$$

where the exponent $e_n$ is an integer number coded on 5 bits, lying between 0 and 31, and $m_n$, the mantissa, is an integer number coded on 9 bits, lying between 0 and 511. With each value of the code $u_n$ there is associated a code word $U_n$ comprising fourteen significant bits, and defined by the relation $$U_n = 512.e_n + m_n \tag{3}$$

deliberately ignoring the fact that the coding defined by the standardizing authorities provides for the use of an additional bit as an indication of the value 0, as this value must always be processed separately, it is suggested that the 0 values be replaced by the values $$1 = 2^0 \left(1 + \frac{0}{512}\right).$$

The process according to the invention consists in replacing in relation (1) which defines the equation of a first-order filter, the string of input values $u_n$ by the string of code words $U_n$. The values obtained for $X_n$ are then code words associated with values very close to the exponential mean and are then ideally suited for calculating the ER bit rates. This simplification eliminates the need to decode the code words.

By choosing the value of a correctly it is also possible to limit the multiplication operations.

For example, if a is equal to 15/16, the state equation of the filter becomes $$X_{n+1} = (15 X_n + U_n)/16. \quad (4)$$

Which can again be written according to the relation:

$$X_{n+1} = ((X_n << 4) - X_n + U_n) >> 4 \quad (5)$$

where the signs << and >> denote, as in the C language, left or right binary shift operators. Comparable results may also be obtained with other notable values of a, such as for example $(2^r - 2^s)/2^r$.

Figure 1:
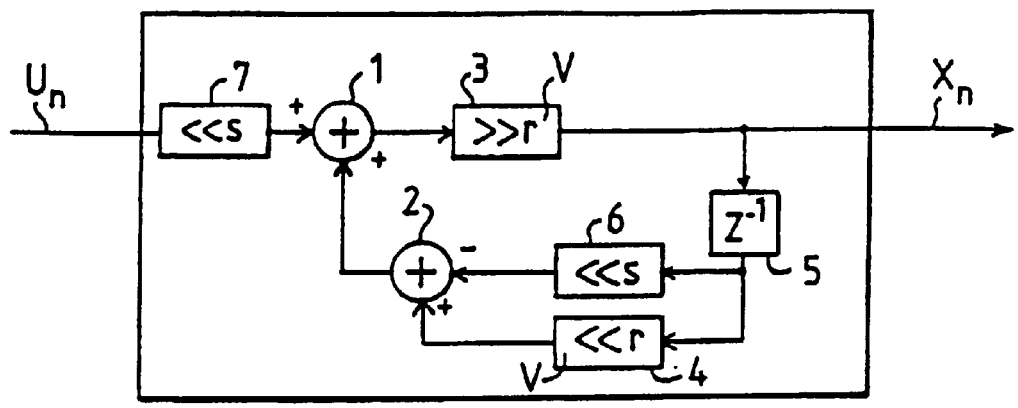
FIG. 1, a device for implementing the process according to the invention.

A corresponding device for implementing the process according to the invention is shown in FIG. 1. This comprises an addition operator 1 receiving the code words $U_n$ on a first operand input and the output from a subtractor operator 2 on a second operand input. It also comprises a first shift operator 3 which is coupled to the output of the adder operator 1 so as to deliver the string of code words $X_n$. The output of the first shift operator 3 is coupled to a first operand input labelled "+" of the subtractor operator 2 by way of a second shift operator 4 and of a delay circuit 5 which are linked in series. A fourth shift operator 6 caters for the transmission of the code words $U_n$ to the first operand input of the addition operator 1.

The second operand input labelled "−" of the subtractor operator 2 is coupled to the output of the delay circuit 5 by way of a third shift operator. According to this embodiment, the first shift operator 3 performs a rightward shift by r bits, the second shift operator 4 performs a leftward shift by r bits, the third operator 6 and the fourth shift operator 7 perform a leftward shift by s bits. The state equation of the filter is then of the form:

$$X_{n+1} = ((2^r - 2^s) X_n + 2^s U_n)/2^r \quad (6)$$

Figure 2A:
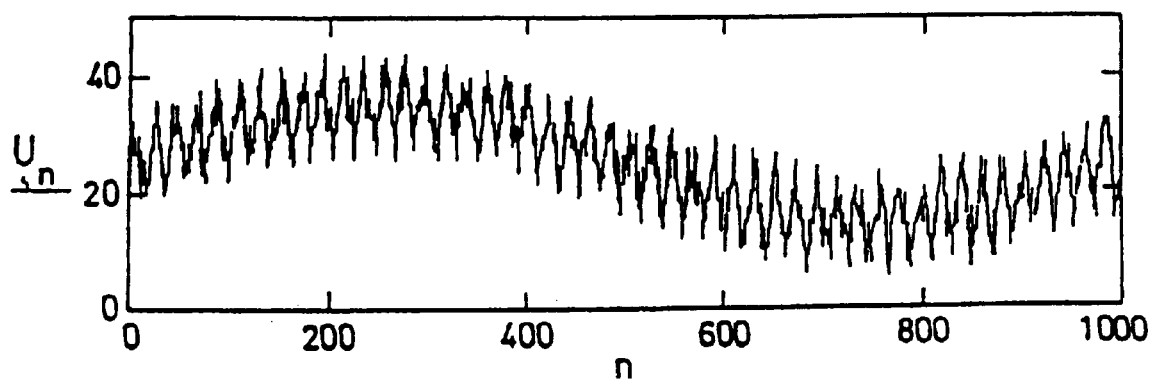
FIGS. 2a to 2c, curves to illustrate the filtering procedure implemented by the invention.
Figure 2B:
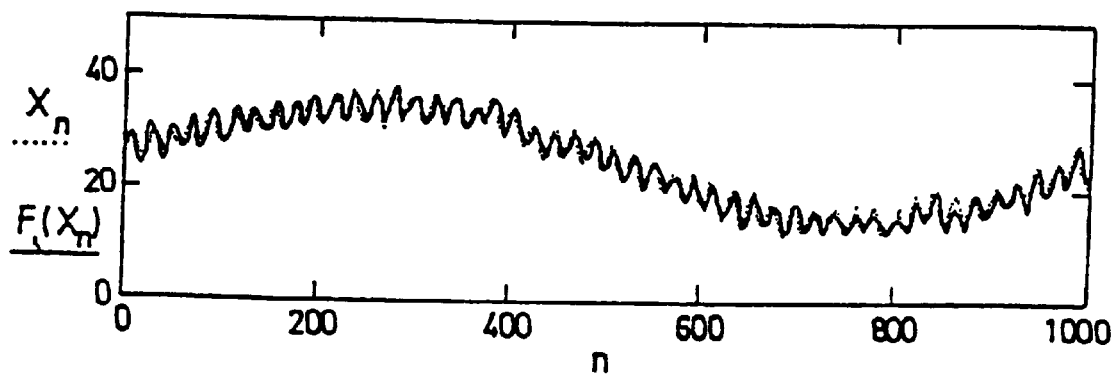

A comparison of the results obtained by the process for the approximate calculation of an exponential mean according to the invention with the non-approximate calculation method is represented in FIG. 2b, for a string of code values $u_n$ which is represented in FIG. 2a and is obtained by superimposing a low-frequency harmonic oscillation, a harmonic oscillation of higher frequency and a random component. In FIG. 2b, $x_n$ represents the exact exponential mean obtained and $F(X_n)$ is the approximate exponential mean obtained by applying relation (5), F being the function which associates a code value with a code word.

Figure 2C:
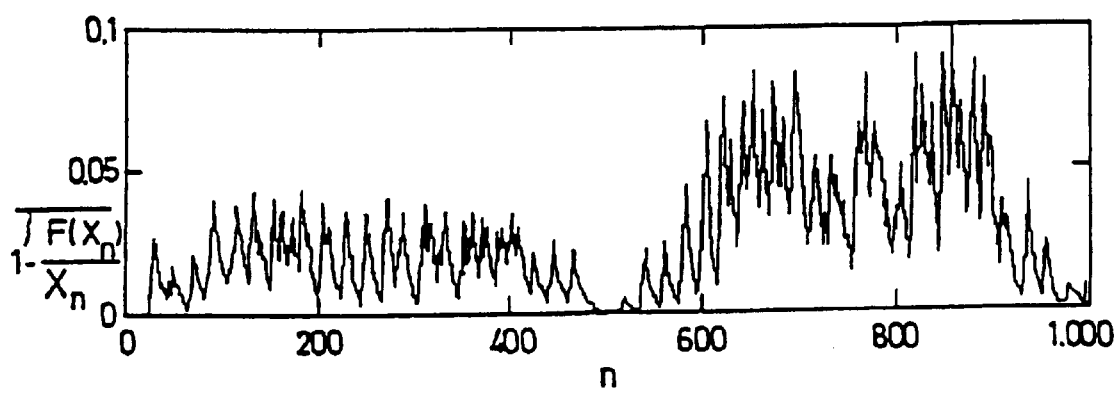

FIG. 2c exhibits the differences between the two curves of FIG. 2b by giving a representation of the relative error which is incurred by replacing $x_n$ by $F(X_n)$. It should be noted that this error is greater for the small values of $x_n$.

What is claimed is:

1. Process for the approximate calculation of the exponential mean of a string of numbers $u_n$ coded in a floating-point format used to convey certain bit rate information in ATM networks, each number representing bit rate information contained in the RM cells of an ATM network and being defined with the aid of an exponent $e_n$ and a mantissa $m_n$ by a relation of the form $u_n = 2^{e_n}.(1 + m_n/512)$, characterized in that it consists in approximating the exponential mean by the code value associated with the exponential mean of the code words $U_n = 512.e_n + m_n$.

2. Process according to claim 1, characterized in that it consists in performing the approximation of the string of code words of the exponential mean of the $u_n$ values by a relation of the form:

$$X_{n+1} = ((2^r - 2^s) X_n + 2^s U_n)/2^r.$$

3. Process according to claim 2, characterized in that r=4 and s=0.

4. Device for the approximate calculation of the exponential mean of a string of numbers $U_n$ coded in a floating-point format used to convey certain bit rate information in ATM networks, for implementing the process according to claim 3, characterized in that it comprises an addition operator receiving a code word $U_n$ on a first operand input and which is coupled by a second operand input to the output of a subtractor operator a first shift operator which is coupled to the output of the adder operator so as to deliver the string of codes $X_n$ a second shift operator coupled in series with a delay by 1 bit circuit between the output of the first shift operator delivering the string of codes $X_n$ and an input of the subtractor operator a third shift operator coupled between the output of the delay by 1 bit circuit and a second operand input of the subtractor operator and a fourth shift operator for applying the code word $U_n$ to the first operand input of the addition operator.

5. Device for the approximate calculation of the exponential mean of a string of numbers $U_n$ coded in a floating-point format used to convey certain bit rate information in ATM networks, for implementing the process according to claim 2, characterized in that it comprises an addition operator receiving a code word $U_n$ on a first operand input and which is coupled by a second operand input to the output of a subtractor operator a first shift operator which is coupled to the output of the adder operator so as to deliver the string of codes $X_n$ a second shift operator coupled in series with a delay by 1 bit circuit between the output of the first shift operator delivering the string of codes $X_n$ and an input of the subtractor operator a third shift operator coupled between the output of the delay by 1 bit circuit and a second operand input of the subtractor operator and a fourth shift operator for applying the code word $U_n$ to the first operand input of the addition operator.

6. Device for the approximate calculation of the exponential mean of a string of numbers $U_n$ coded in a floating-point format used to convey certain bit rate information in ATM networks, for implementing the process according to claim 1, characterized in that it comprises an addition operator receiving a code word $U_n$ on a first operand input and which is coupled by a second operand input to the output of a subtractor operator a first shift operator which is coupled to the output of the adder operator so as to deliver the string of codes $X_n$ a second shift operator coupled in series with a delay by 1 bit circuit between the output of the first shift operator delivering the string of codes $X_n$ and an input of the subtractor operator a third shift operator coupled between the output of the delay by 1 bit circuit and a second operand input of the subtractor operator and a fourth shift operator for applying the code word $U_n$ to the first operand input of the addition operator.

7. Device according to claim 6, characterized in that the first shift operator performs a rightward shift by r bits, the second shift operator performs a leftward shift by r bits the third shift operator and the fourth shift operator perform a leftward shift by s bits.

* * * * *